United States Patent [19]

Nestlerode et al.

[11] Patent Number: 4,728,705

[45] Date of Patent: Mar. 1, 1988

[54] OLEFIN POLYMERIZATION CATALYST COMPOSITION

[75] Inventors: Steven M. Nestlerode, Katy; Israel G. Burstain; Robert C. Job, both of Houston, all of Tex.

[73] Assignee: Shell Oil Company, Houston, Tex.

[21] Appl. No.: 944,720

[22] Filed: Dec. 22, 1986

Related U.S. Application Data

[62] Division of Ser. No. 835,079, Feb. 28, 1986, abandoned.

[51] Int. Cl.$^4$ ................................................ C08F 4/64
[52] U.S. Cl. ...................................... 526/125; 526/124; 526/138; 526/351
[58] Field of Search ......................... 526/124, 125, 138

[56] References Cited

U.S. PATENT DOCUMENTS

| | | | |
|---|---|---|---|
| 3,591,656 | 7/1971 | Kroll | 260/683.9 |
| 4,329,253 | 5/1982 | Goodall et al. | 252/429 B |
| 4,393,182 | 7/1983 | Goodall et al. | 526/124 |
| 4,400,302 | 8/1983 | Goodall et al. | 252/429 B |
| 4,414,132 | 11/1983 | Goodall et al. | 502/127 |
| 4,465,783 | 8/1984 | McKenzie | 502/105 |
| 4,540,679 | 9/1985 | Arzoumanidis | 502/111 |

FOREIGN PATENT DOCUMENTS 2101610  1/1983  United Kingdom .

OTHER PUBLICATIONS

Concepts in Catalysis, Rideal, Pub. by Academic Press, New York, N.Y. (1968), p. 5.

*Primary Examiner*—Patrick P. Garvin, Sr.

[57] ABSTRACT

Olefin polymerization catalyst components having improved activity and morphological properties are disclosed and claimed. In particular, the components are prepared by reacting a carbonized magnesium alkoxide or aryloxide component with a halogenated tetravalent titanium component, a halohydrocarbon component and an electron donor.

14 Claims, No Drawings

OLEFIN POLYMERIZATION CATALYST COMPOSITION

This is a division of application Ser. No. 835,079, filed Feb. 28, 1986 and now abandoned.

FIELD OF THE INVENTION

This invention relates to a process for preparing solid olefin polymerization catalyst components having improved activity and morphological properties, the component being prepared from a carbonated magnesium alkoxide or aryloxide.

BACKGROUND OF THE INVENTION

Numerous proposals are known from the prior art to provide olefin polymerization catalysts by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalyst of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-paramethoxybenzoate(ethyl anisate) or methyl-p-toluate.

While the selection of cocatalyst and selectivity control agent affects the performance of those catalyst systems, the component which appears to be subject to most significant improvement with respect to activity and productivity of the system is the procatalyst.

Preferred methods of preparing such procatalysts are claimed in U.S. Pat. Nos. 4,329,253; 4,393,182; 4,400,302; and 4,414,132. These procatalysts are highly active and stereospecific. The typical manner of preparing such procatalysts involves the reaction of the magnesium compound, titanium tetrachloride and electron donor in the presence of a halohydrocarbon. The resulting solid particles are then contacted with additional quantities of $TiCl_4$ and are completed by washing off excess $TiCl_4$ using light hydrocarbons (e.g., isooctane and isopentane) and drying.

The procatalysts decribed above have excellent polymerization activity (polymer yield) and stereospecific performance (isotactic content). However, for some applications the polymer morphology is not ideal. In olefin polymerization, polymer morphology is known to be a replica of catalyst morphology. Still further, the procatalyst morphology also depends upon the morphology of the starting magnesium compound. Accordingly, if one desires to have optimal catalyst morphology (e.g. spherical particles), then it is desirable to employ starting magnesium compounds of the same morphology.

A number of different approaches to improved morphology are suggested in the patent literature. One approach, disclosed in GB No. 2,101,610, involves reacting a solid particular material with an organic magnesium compound, treating the supported magnesium composition with oxygen, carbon dioxide or a hydroxyl compound, reacting the treated product with a carbonyl compound and simultaneously or subsequently reacting with a transition metal compound. Another approach, disclosed in U.S. Pat. No. 4,465,783, involves the spray drying of a transition metal composition, or a support for a transition metal compound, suspended in a liquid medium. Still another method is disclosed in DE No. 2,839,188, where solid magnesium dialkoxide particles are dispersed into a suitable liquid phase, followed by spray-drying. However, the process of the De No. 2,839,188 patent is not attractive as the dispersed solid particles will tend to clog the fine orifices of the spray-drying equipment and will foul the pumping and metering systems. In U.S. Pat. No. 4,540,679, use is made of a magnesium hydrocarbyl carbonate support. In the U.S. Pat. No. 4,540,679 patent, a suspension of magnesium alcoholate with carbon dioxide is reacted with a transition metal component to precipitate a "magnesium hydrocarbyl carbonate" support. The patentees use a number of techniques, including prepolymerization and the use of triethyl aluminum (TEA) to remove ethanol, to improve productivity. However, these techniques are not desirable—e.g., prepolymerization is an additional step and the addition of TEA adds ash to the polymer product.

A new approach has now been found, that permits the preparation of procatalyst particles having not only excellent productivity and selectivity, but also possessing excellent morphology.

SUMMARY OF THE INVENTION

The present invention relates to an improved solid catalyst component for the polymerization of alpha-olefins. In particular, the present invention relates to a solid magnesium halide/titanium halide catalyst component useful for the polymerization of alphaolefins which has been obtained by (a) contacting a carbonated magnesium compound of the formula MgR'R".xCO$_2$ wherein R' is an alkoxide or aryloxide group, R" is an alkoxide group, aryloxide group or halogen, and x has a value between about 0.1 and 2.0 with a halide of tetravalent titanium in the presence of a halohydrocarbon and an electron donor;

(b) contacting the resulting halogenated product with a tetravalent titanium halide;

(c) washing the resulting product to remove unreacted titanium compounds; and (d) recovering the solid product.

As shown in the examples which follow propylene polymers produced with the catalyst system of the present invention have an extremely low level of fines (e.g., very little polymer smaller than 250 microns in diameter). Accordingly, this catalyst can be very useful in gas phase processes where fines are deleterious to the process. Further, it is possible with the subject catalyst to produce polymer having a uniformly optimized particle size, i.e. a relatively narrow particle size distribution. Such polymers may also have a higher bulk density (above about 0.38 g/cc) and a ratio of short diameter (sd) to long diameter (ld) between about 0.7 to 1.0.

The catalyst of the present invention differs from the catalysts of U.S. Pat. No. 4,540,679, in that the "support" in the present invention is a magnesium halide while the "support" in the U.S. Pat. No. 4,540,679 is ostensibly a magnesium hydrocarbyl carbonate. Further, in the present invention the CO$_2$ is used only as a means of solubilizing the magnesium alcoholate for controlling catalyst morphology, and in fact, the CO$_2$ is evolved during the catalyst preparation (digestion) or even before contact with the titanium halide.

It is also possible with the present invention to prepare catalyst particles having varying appearances from raisin-like to spherical. Such raisin-like catalyst particles would have a high surface area and are preferred in the production of high ethylene content (above four percent) ethylene/propylene random copolymers and in-situ impact copolymers without the fouling problems normally associated with the production of such polymers. The high surface area, more porous catalyst allows the producer to support more of the sticky polymer within the catalyst matrix.

DETAILED DESCRIPTION OF THE INVENTION

The key aspect of the present invention involves the use of a carbonated magnesium compound of the formula MgR'R".xCO$_2$ wherein R' is an alkoxide or aryloxide group, R" is an alkoxide group, aryloxide group or halogen and x has a value between about 0.1 and 2.0. While an excess of CO$_2$ (above 2.0 per Mg) may be used, only one CO$_2$ equivalent will undergo a Lewis acid base reaction with each equivalent of the particular Mg component (e.g. Mg dialkoxide).

Carbonated magnesium ethylate having the molecular formula C$_4$H$_{10}$O$_2$Mg.xCO$_2$ where x is 1.2 up to 1.3 is available from Dynamit Nobel. Such material is actually a mixture of two compounds. When X=1, the structural formula is thought to be

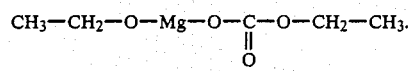

When x=2, the structural formula is thought to be

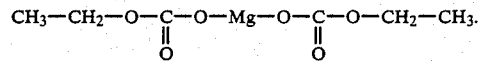

The average molecular weight is about 170 and the typical analysis shows about 14.3–14.6% Mg.

In general, the carbonated magnesium compounds are prepared by contacting essentially anhydrous carbon dioxide with a dispersion of the (MgR'R") in a suitable diluent. By the term essentially anhydrous carbon dioxide, is meant carbon dioxide which is at least 99.5% pure carbon dioxide and is denoted "commercial" grade up to and including pure carbon dioxide. It is preferred that the carbon dioxide be 99.8% or more pure CO$_2$. Oxygen and nitrogen impurities are only important if they cause flammability problems. Water is a problem and must be avoided.

Typically, the CO$_2$ is bubbled through the dispersion of magnesium compound and diluent. Since the reaction is exothermic, one may continue bubbling the CO$_2$ until the exotherm has ended. During this process the mixture warms and the solid compound dissolves. By the end of the addition a turbid, viscous solution forms. One can also use "dry ice" as the source of CO$_2$.

The diluent or solvent employed is any material in which the carbonated magnesium compound is soluble at desired conditions. Preferred diluents are alcohols. However, other polar solvents such as acetone or dimethyl formamide (DMF) may also be used, as well as mixed solvents. Preferably, the alcohol group (R'—OH) employed is the same as the alkoxide or aryloxide group Mg—(OR)$_2$—, i.e., R and R' are the same. For example, if magnesium ethoxide is used, then it is preferred that the diluent be ethanol. This choice reduces problems with transesterification and other problems in the matethesis reaction. Since the most preferred magnesium compound is magnesium diethoxide, the most preferred diluent is ethanol.

The relative amounts of magnesium compound and diluent depends upon the particular components used, the conditions employed (e.g. temperature) and the desired concentration. Typically, the concentration of magnesium compound is between about 2 and about 40 percent solids, as determined by current spray drying techniques. The temperatures employed here are typically between about 0° C. and about 80° C., and the mixture (solution) is continuously stirred during the CO$_2$ bubbling. See generally U.S. Pat. Nos. 4,529,715 and 4,530,915 for a discussion of CO$_2$ bubbling techniques.

Examples of halogen containing magnesium compounds that can be used as starting materials for the reaction are alkoxy and aryloxy magnesium halides, such as isobutoxy magnesium chloride, ethoxy magnesium chloride, ethoxy magnesium bromide, phenoxy magnesium iodide, cumyloxy magnesium bromide and naphthenoxy magnesium chloride.

Preferred magnesium compounds are selected from magnesium dialkoxides and magnesium diaryloxides. In such compounds the alkoxide groups suitable have from 1 to 8 carbon atoms, and preferably from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium diethoxide is particularly preferred.

Another key aspect of the present invention involves taking the solution of the carbonated magnesium compound and converting it into solid particles of a uniformly optimized shape having the desired morphology and particle size. There are two general ways to accomplish this. One way involves spray drying and the other involves impregnation of an inert particulate material.

The spray-drying used herein may be effected using conventional spray-drying techniques. Thus, the mixture is passed through a suitable atomizer which creates a spray or dispersion of droplets of the mixture, a stream of a hot gas is arranged to contact the droplets and cause evaporation of the liquid medium and the solid product which separates is collected. Suitable atomizers for producing the droplets of the suspension include nozzle atomizers and spinning disk atomizers.

Atomization typically takes place in the absence of water and oxygen.

The temperature at which the spray-drying is effected controls, in part, the shape of the resulting particles. Typical temperatures are 40° to 120° C., preferably about 50° to 90° C. for ethanol-based solutions. Preparation of spherical particles depends upon solids content of the solution and operating (spray drying) temperature. At constant solids, too hot a temperature will result in hollow splintered particles. Too cold a temperature will give insufficient removal of solvent and particle agglomeration.

It will be appreciated that the temperature of the hot gas will be at least equal to the maximum temperature attained by the droplets or spray-dried material.

The hot gas may be arranged to pass in a countercurrent flow to the droplets of the mixture but typically a cocurrent flow of the hot gas and the mixture is used. Using a cocurrent flow, the atomizer is typically located at the top of the spray-drying apparatus and the hot gas is introduced into the top of the apparatus and is removed from near the bottom of the apparatus.

Some of the spray-dried solid collects at the bottom of the apparatus, from which it may be removed, preferably continuously, by suitable means such as a star feeder valve, a screw conveyor, or in the hot gas stream.

The hot gas, which has been cooled by its passage through the spray-drying apparatus may be removed separately from the spray-drying apparatus. The hot gas may be passed through a cyclone to remove entrained solid, and the solid removed in the cyclone may be added to any which is separately removed from the spray-drying apparatus. The vapor of the liquid medium which is present in the hot gas is desirably condensed in a suitable condenser, and the condensed liquid medium can be re-used for mixing with the solid material. The gas may then be reheated and recirculated to the spray-drying apparatus.

The pressure in the vessel can be varied to enhance or hinder devolitilization. Slight positive pressure in the vessel is preferred to prevent water and $O_2$ contamination.

The nozzle-orifices are adjusted with the conventional spray-drying equipment to produce particles having the desired particle size. It is preferred that essentially all of the particles of the final spray-dried material are in the range from 2 to 250 microns, preferably at least 90% by weight of the particles are in the range from about 10 to about 40 microns, for example having a mean size of about 20 microns. A description of typical spray-drying equipment and conditions can be found in U.S. Pat. No. 4,465,783.

Another method for forming the particles of the desired morphology is by impregnating an inert particulate support already having the desired morphology with the solution of the carbonated magnesium compound.

The carrier materials, i.e., the supports, are solid, particulate materials which are inert to the other components of the catalyst composition, and to the other active components of the reaction system. These carrier materials would include inorganic materials such as oxides of silicon and aluminum and molecular sieves, and organic materials such as polymers such as polyethylene polyesters, etc. When the carrier materials are inorganic oxides, they are used in the form of dry powders having an average particle size of about 10 to 250, and preferably of about 50 to 150 microns. These materials are also preferably porous and have a surface area of $\geq 3$, and preferably $\geq 50$, square meters per gram. The inorganic oxides should be dry, that is, free of absorbed water. Drying of the oxide material can be carried out by heating it at a temperature of $>200°$ C. or by chemical treatment.

The carriers are added to the solution of the carbonated magnesium compound, and then the solvent is evaporated. Typically, the solution is maintained at atmospheric pressure and the temperature maintained at about 80° to about 90° C. until the resulting powder appears dry. Under vacuum conditions the temperature may be, e.g., 60° to 90° C. The desired temperature and pressure may be readily determined by one skilled in the art. If desired, the resulting powder may be washed one or more times with an inert, such as isopentane, to ensure that the alcohol, etc., is removed.

Once the uniformly optimized particles of the magnesium compound have been obtained, it is then necessary to convert the compounds to magnesium halides in a metathesis reaction (digestion), such as that disclosed in U.S. Pat. No. 4,414,132.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e., yielding magnesium halides in which the atomic ratio of halogen to magnesium is at least 1.5. The most preferred reactions are those leading to fully halogenated reaction products, i.e., magnesium-dihalides. Such halogenation reactions are suitably effected by employing a molar ratio of magnesium compound to titanium compound of 0.005:1 to 2:1, preferably 0.01:1 to 1:1. These halogenation reactions are conducted in the additional presence of a halohydrocarbon and an electron donor. An inert hydrocarbon diluent or solvent may also be present. When using an inert diluent or solvent, this should of course not be used as a complete substitute for the halohydrocarbon, for it is important that the halogenation reaction proceeds in the presence of a halohydrocarbon.

Suitable halides of tetravalent titanium include aryloxy- or alkoxy-di- and trihalides, such as dihexanoxy-titanium dichloride, diethoxy-titanium dibromide, isopropoxy-titanium tri-iodide and phenoxy-titanium trichloride, titanium tetrahalides are preferred; most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons.

Suitable electron donors which are used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters, diesters and diamines, particularly esters and diesters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, isobutyl phthalate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,3,4,5-tetraethyl piperidine and similar compounds. The electron donors may be used singly or in combination. Preferred electron donors for use in preparing the titanium constituent are ethyl benzoate and isobutyl phthalate.

The halogenation normally proceeds under formation of a solid reaction product which may be isolated from the liquid reaction medium by filtration decantation or another suitable method and may be subsequently washed with an inert hydrocarbon diluent, such as n-hexane, iso-octane or toluene, to remove any unreacted material, including physically absorbed halohydrocarbon.

Subsequent to halogenation, the product is contacted with a tetravalent titanium halide such as a dialkoxytitanium dihalide, alkoxy-titanium trihalide, phenoxy-titanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium chloride is most suitably carried out at a temperature of from 60° to 136° C. during 0.1-6 hours, optionally in the presence of an inert hydrocarbon or halohydrocarbon diluent. Particularly preferred contacting temperatures are from 70° to 120° C. and the most preferred contacting periods are between 0.5 to 3.5 hours. The treatment may be carried out in successive contacts of the solid with separate portions of TiCl$_4$, which may contain suitable electron donors chosen from the previous list.

The preferred halogen atom, possibly contained in the magnesium compound to be halogenated, and contained in the titanium compound which serves as halogenating agent and in the tetravalent titanium halide with which the halogenated product is contacted, is chlorine.

After the treatment with tetravalent titanium halide the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent.

The material used to wash the catalyst component is an inert, light hydrocarbon liquid. Preferred light hydrocarbon liquids are aliphatic, alicyclic and aromatic hydrocarbons. Examples of such liquids include iso-pentane, n-hexane, iso-octane and toluene, with iso-pentane being most preferred.

The amount of light hydrocarbon liquid employed is 5 to 100 cc/gm of procatalyst in each of 2 to 6 separate washes, preferably about 25 cc/gm.

The resulting solid component is the procatalyst, which is used with cocatalyst and selectivity control agent in the polymerization process.

Suitable electron donors, which are used in combination with or reacted with an organoaluminum compound as selectivity control agents and which are also used in the preparation of the solid catalyst component are ethers, esters, ketones, phenols, amines, amides, imines, nitriles, phosphines, silanes, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and organic silicon compounds. Preferred esters are esters of aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amine hexyl benzoate, isopropyl naphthenate, n-amyl toluate, ethyl cyclohexanoate, propyl pivalate. Examples of the organic silicon compounds useful herein include alkoxysilanes and acyloxysilanes of the general formula $R^1{}_n Si(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane, phenyltrimethoxy silane and the like. The donor used as selectivity control agent in the catalyst may be the same as or different from the donor used for preparing the titanium containing constituent. Preferred electron donors for use in preparing the titanium constituent are ethyl benzoate and isobutyl phthalate. Preferred as selectivity control agent in the total catalyst is p-ethoxy ethyl benzoate, phenethyltrimethoxy silane and diphenyldimethoxy silane.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mol per mol aluminum compound, are in the range from 0.005 to 1.5, particularly from 0.1 to 0.5. Preferred portions of selectivity control agent calculated as mol per mol Ti is in the range of 0.1 to 50, particularly 0.5 to 20.

Proportions of electron donor contained in the solid catalyst component, calculated as mol per mol of magnesium, are suitably in the range of from 0.01 to 10, e.g., from 0.01 to 10 and from 0.05 to 5.0 and especially from 0.05 to 0.5.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1 to 150, and suitably from about 10 to about 150. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

The present invention is also concerned with a process for polymerizing an alpha monoolefin such as ethylene or butylene, preferably propylene, employing the novel catalyst components and compositions. These polymerization may be carried out by any of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the novel catalyst compositions or one or more of the catalyst components to the polymerization reactor. The activity and stereospecificity of the novel catalyst compositions are so pronounced that there is no need for any catalyst removal or polymer extraction techniques. Total metal residues in the polymer, i.e., the combined aluminum, magnesium and titanium content, can be as low as 150 ppm, even less than 75 ppm.

It is well known that supported coordination procatalysts and catalyst systems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and freed of potential catalyst poisons.

The productivity of the procatalyst is determined as kg polymer/g procatalyst in a standard one or two hour batch reaction; it may also be expressed as kg polymer/g Ti. Catalyst activity is sometimes reported as kg polymer/g procatalyst/hr. If determined in a standard one hour test, activity thus is numerically the same as productivity.

The selectivity to isotactic polypropylene is determined by measuring the amount of xylene soluble polymer (XS), in accordance with regulations of the U.S. Food and Drug Administration. The XS test is carried out as follows:

The sample is completely dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 10 ml aliquot of the filtrate, drying the residue under vacuum, and weighing the residue. The xylene-solubles consist of amorphous material with some low molecular weight crystalline material. (FDA regulations 121.2501 and 1.1.2510, 1971.)

The numerical value of XS in the case of propylene homopolymer is typically about 2 percent less than the amount of polymers extractable in refluxing n-heptane. Thus the isotacticity index of polypropylene (amount insoluble in refluxing n-heptane) is approximately 100-(XS+2).

Catalyst productivity at standard conditions exhibits an inverse relationship with stereoselectivity. This relationship is characteristic for any given procatalyst. It is generally possible to control these variables, within limits, by changing the proportion of selectivity control agent (SCA). Increasing the amount of SCA increases selectivity to isotactic or stereoregular polymer but reduces activity, and hence productivity, in a standard one hour test.

The following examples illustrate the invention:

ILLUSTRATIVE EMBODIMENT I

Illustrative Embodiment I shows the preparation of catalysts supported on silica. First, about 20.3 grams of magnesium diethoxide was added to 700 ml ethanol in a flask. Then $CO_2$ was bubbled through the flask until all the solid was dissolved. Excess $CO_2$ was allowed to exit through a bubbler. The reaction took place over approximately 30 minutes and was evidenced by an increase in temperature of the ethanol solution. Note that carbonated magnesium ethylate may also be prepared by dropping dry ice into a slurry of ethanol and magnesium ethoxide while stirring. In such case stirring is continued until all of the magnesium ethoxide is dissolved.

Catalyst Manufacture on Silica

To a flask containing 6 gm of silica (silicas used included Davison SGB-5, Davison 952, particle size 50–70 microns, pore volume 1.05 and 1.7 cc/gm; silicas were dried under nitrogen and some treated with $BF_3$, $BCl_3$) were added 100 ml of the above carbonated magnesium solution. The ethanol was evaporated while stirring at 85° C. until the resulting powder appeared dry. The solid was then washed with isopentane 5 times. A 50:50 volume mix of TiCl$_4$ and chlorobenzene was then added to the solid (75 ml) along with 1.2 ml of ethyl benzoate. The mixture was then heated to 100° C. for 1 hour and the liquid filtered at the end of that hour. An additional quantity of TiCl$_4$:CB was added and heated to 110° C. for 30 minutes, followed by filtration. A final addition of TiCl$_4$:CB was added with 0.3 ml of benzoyl chloride. The mixture was heated to 110° C. for 30 minutes followed by filtration. To remove adsorbed TiCl$_4$ the catalyst was washed with isopentane in 6 additions.

Polymerization

To 2.7 liters of propylene was added 0.7 mmol of triethyl aluminum, 0.35 mmol of p-ethoxy ethyl benzoate, and the catalyst prepared above equivalent to 0.01 mmol of Ti in which 0.15 mmol of diethyl aluminum chloride was added to the catalyst and premixed for 10 minutes. Polymerization was carried out for 2 hours.

Results are presented in the Comparative Tables below.

ILLUSTRATIVE EMBODIMENT II

In Illustrative Embodiment II catalysts were prepared from carbonated magnesium ethoxide and no deliberate attempt was made to control morphology.

Catalyst Manufacture

Carbonated magnesium ethylate was prepared as indicated above under silica preparations; however, the solid carbonated magnesium ethylate was obtained by evaporating the ethanol from the solution by nitrogen purging or removal in a rotavap. The solids were treated further by drying exhaustively in nitrogen, at 100° C. or at 150° C. (it is reported by Dynamit Nobel that CO$_2$ is lost between 100° and 140° C.). Heating at 150° C. resulted in a 40% weight loss, which corresponds to a complete loss of CO$_2$. The solids obtained after N$_2$ drying was then treated identically to the catalyst manufacture detailed under the silica preparations except no silica was added.

Polymerization

Again the polymerizations were completed in liquid propylene. The cocatalyst used was again triethyl aluminum and the selectivity control agent was p-ethoxy benzoate; diethyl aluminum chloride was sometimes used in a percontact step with the catalyst. Catalyst charged was enough to charge 0.01 mmol of Ti. Some polymerizations were also completed in the gas phase at 300 psig and 65° C. Reaction times were 2 hours unless indicated. Representative yields are indicated in the comparative table below.

ILLUSTRATIVE EMBODIMENT III

In Illustrative Embodiment III catalyst was manufactured from spray dried carbonated magnesium ethoxide.

Manufacture of the Spray Dried Solid

A solution of carbonated magnesium ethylate was prepared in the same manner as discussed under the silica section. The resulting solution was approximately 33% carbonated magnesium ethylate by weight. This solution was pumped at a controlled flow rate to a small nozzle at which point the resulting fluid stream was placed into intimate contact with nitrogen at varying temperatures. Solid prepared by contacting with nitrogen at 100°–120° C. gave hollow spheres, many of which had exploded into nutshell like fragments. Solids obtained from contact with nitrogen at 80° and 60° C. yielded solids resembling the shape of shriveled peas (raisins).

Catalyst Manufacture

The solid obtained from spray drying was heated in a quartz tube to 70° C. while passing nitrogen through the solid for 7 hours, then heated for 40 hours with nitrogen flow at 105° C., and finally a 1 hour period at 150° C. The CO$_2$ was effectively removed. 6.0 grams of the above solid was placed in a catalyst manufacturing flask. At room temperature, 150 ml of a 50:50 volume mix of TiCl$_4$:CB was added along with 2.4 ml of ethyl benzoate. The mixture was heated to 110° C. and allowed to mix for 1 hour at which time the liquid was filtered off. An additional 150 ml of TiCl$_4$:CB mix was added along with 1.5 ml of diisobutyl phthalate and the mixture was allowed to remain at 110° C. for 30 minutes upon which time the liquid was filtered. The above step was repeated one additional time followed by a final wash with 150 ml of TiCl$_4$:CB. The final catalyst was then washed 6 times with isopentane.

Polymerization

The above catalyst was polymerized in liquid propylene. The cocatalyst used was triethyl aluminum, and the selectivity control agent was phenethyl trimethoxy silane. Enough catalyst was added to give 0.01 mmol of Ti. The residence time was 2 hours.

COMPARATIVE EXAMPLE I

The comparative catalyst (standard cat) was prepared in a similar manner to U.S. Pat. No. 4,414,132 and the above examples, but without the use of CO$_2$. Broadly, magnesium diethoxide was reacted with TiCl$_4$ and ethyl benzoate in the presence of chlorobenzene to form a solid component. The solid was treated with additional washes of TiCl$_4$/chlorobenzene, with one wash also containing benzoyl chloride. The polymerization was similar to that employed in Illustrative Embodiment I.

The various catalysts prepared above are compared below. Not all results are shown, and, for the most part, the best catalyst productivities and representative morphologies are shown. As shown, it has been possible to achieve polymer productivities equivalent to the prior art catalyst (not prepared from carbonated Mg compounds), but with superior morphology. The spray dried material shows a significant difference in the level of material below 250 microns; 2.0% wt. versus 10.2% wt. for a prior art catalyst. The shape of the particle has been significantly improved also from rock like particles to a uniform raisin like particle.

TABLE 1

Comparative Tables
PARTICLE SIZE DISTRIBUTIONS OF POLYMER

| Wt. fraction microns | Silica Supported (I.E. I) | Spray Dried (I.E. III) | Standard Cat (comparison) | Carbonized Mg non-optimized Morphology (I.E. II) 100° C. |
|---|---|---|---|---|
| >2000 | 45.4 | 7.5 | 5.2 | 1.8 |
| 1000–2000 | 30.4 | 34.4 | 39.2 | 44.2 |
| 500–1000 | 16.4 | 40.7 | 29.9 | 35.3 |
| 250–500 | 5.5 | 15.4 | 15.5 | 13.6 |
| 120–250 | 1.6 | 2.0 | 6.8 | 4.2 |
| <120 | 0.6 | 0.0 | 3.4 | 1.0 |

TABLE 1-continued

Comparative Tables
PARTICLE SIZE DISTRIBUTIONS OF POLYMER

| Wt. fraction microns | Silica Supported (I.E. I) | Spray Dried (I.E. III) | Standard Cat (comparison) | Carbonized Mg non-optimized Morphology (I.E. II) 100° C. |
|---|---|---|---|---|
| Avg. | 1311 | 738 | 694 | 693 |

TABLE 2

| | Silica Supported (I.E. I) | Spray Dried (I.E. III) | Standard Cat (comparison) | Carbonated non-optimized (100° drying) Morphology (I.E. II) | Carbonated Mg (heated at 150° C. to drive off $CO_2$) (I.E. II) |
|---|---|---|---|---|---|
| Yield (gms) | 485 | 583 | 340 | 305 | 530 |
| Xylene Solubles % wt. | 10.5 | 2.2 | 4.0 | 4.3 | 4.7 |
| TEA (mmol) | 0.7 | 0.7 | 0.7 | 0.7 | .7 |
| DEAC (mmol) | 0.15 | 0.0 | 0.0 | 0.0 | — |
| SCA (mmol) | 0.35 | 0.07 | 0.35 | 0.35 | .35 PEEB |
| Reaction Time (hrs) | 2 | 2 | 1 | 1 | 2 |

What is claimed is:

1. A process for the catalytic polymerization of an alphaolefin by contact with a titanium-containing catalyst which contains a solid magnesium halide/titanium halide catalyst component containing no carbonate magnesium compound which has been obtained by
   (a) heating a carbonated magnesium compound of the formula MgR'R"x$CO_2$ wherein R' is an alkoxide or aryloxide group, R" is an alkoxide group, aryloxide group or halogen, and x has a value between about 0.1 and 2.0 to a temperature above 100° C. for a period of time sufficient to cause complete loss of $CO_2$;
   (b) contacting the resulting product with a halide of tetravalent titanium in the presence of a halohydrocarbon and an electron donor;
   (c) contacting the resulting halogenated product with tetravalent titanium halide;
   (d) washing the resulting product to remove unreacted titanium compounds; and
   (e) recovering the solid products, and wherein the catalyst also contains an organoaluminum compound and a selectivity control agent.

2. The process of claim 1 wherein said carbonated magnesium compound is prepared by bubbling essentially anhydrous $CO_2$ through a dispersion of MgR'R" in an alcohol.

3. The process of claim 1 wherein said carbonated magnesium compound is in the form of essentially spherical particles such that at least 90% by weight of the particles have diameters between about 10 and about 40 microns.

4. The process of claim 1 wherein said essentially spherical particles are obtained by spray drying a solution of said carbonated magnesium compound.

5. The process of claim 1 wherein said essentially spherical particles are obtained by impregnating an inert particulate support with a solution of said carbonated magnesium compound and removing the solvent.

6. The process of claim 1 wherein R' and R" are both ethoxide groups.

7. The process of claim 2 wherein R' and R" are both ethoxide groups and the alcohol is ethanol.

8. The process of claim 6 wherein said tetravalent titanium halide is $TiCl_4$ and said halohydrogen is a chlorohydrocarbon.

9. The process of claim 6 wherein said electron donor is an ester or diester of an aromatic carboxylic acid.

10. The process of claim 1 wherein the atomic ratio of aluminum to titanium is about 30:1 to about 100:1.

11. The process of claim 10 wherein said organoaluminum compound is a trialkylaluminum and said selectivity control agent is selected from the group consisting of esters and diesters of aromatic carboxylic acids and silicon compounds of the general formula $R^1_N Si(OR^2)_{4-n}$, where n is between zero and three, $R^1$ is a hydrocarbon group or a halogen atom and $R^2$ is a hydrocarbon group.

12. The process of claim 11 wherein said trialkylaluminum is triethyl aluminum.

13. The process of claim 11 wherein said selectivity control agent is selected from ethyl benzoate and diisobutyl phthalate.

14. The process of claim 11 wherein said selectivity control agent is selected from diphenyl dimethoxy silane and phenethyltrimethoxy silane.

* * * * *